United States Patent
Pausch et al.

(10) Patent No.: US 9,446,733 B2
(45) Date of Patent: Sep. 20, 2016

(54) VEHICLE WITH A GAS BAG ARRANGEMENT OF A VEHICLE OCCUPANT RESTRAINT SYSTEM

(71) Applicant: TAKATA AG, Aschaffenburg (DE)

(72) Inventors: Tobias Pausch, Berlin (DE); Ingo Müller, Erkner (DE); Torsten Steiner, Berlin (DE); Kay Schöfisch, Berlin (DE); Dirk Meissner, Berlin (DE)

(73) Assignee: TAKATA AG, Aschaffenburg (DE)

( * ) Notice: Subject to any disclaimer, the term of this patent is extended or adjusted under 35 U.S.C. 154(b) by 0 days.

(21) Appl. No.: 14/417,548

(22) PCT Filed: Jul. 29, 2013

(86) PCT No.: PCT/EP2013/065903
§ 371 (c)(1),
(2) Date: Jan. 26, 2015

(87) PCT Pub. No.: WO2014/016432
PCT Pub. Date: Jan. 30, 2014

(65) Prior Publication Data
US 2015/0203066 A1      Jul. 23, 2015

(30) Foreign Application Priority Data

Jul. 27, 2012 (DE) ......................... 10 2012 213 284

(51) Int. Cl.
*B60R 21/214*      (2011.01)
*B60R 21/231*      (2011.01)
(Continued)

(52) U.S. Cl.
CPC ........... *B60R 21/214* (2013.01); *B60R 21/207* (2013.01); *B60R 21/231* (2013.01);
(Continued)

(58) Field of Classification Search
CPC ............ B60R 21/214; B60R 21/2334; B60R 21/231; B60R 2021/23308; B60R 2021/23386; B60R 2021/23153; B60R 21/232; B60R 21/207; B60R 2021/2074; B60R 2021/0048
See application file for complete search history.

(56) References Cited

U.S. PATENT DOCUMENTS 4,976,649 A * 12/1990 Mandell ................. A63H 27/10
                                                         156/253
6,116,644 A * 9/2000 Viano .................... B60R 21/231
                                                         280/728.2
(Continued)

FOREIGN PATENT DOCUMENTS

DE   10 2007 005 304 A1   8/2008
EP        1 502 825 A1    2/2005
GB        0 953 312       3/1964

OTHER PUBLICATIONS

International Search Report for Application No. PCT/EP2013/065903 mailed Oct. 21, 2013.

*Primary Examiner* — Paul N Dickson
*Assistant Examiner* — Timothy Wilhelm
(74) *Attorney, Agent, or Firm* — Gordon & Rees LLP

(57) ABSTRACT

This invention relates to a gas bag arrangement of a vehicle occupant restraint system, the gas bag arrangement comprising:
  a gas bag (1) which includes at least one inflatable chamber (11) with a first and a second portion (111, 112); and
  at least one connecting element (51, 51', 52) which connects the first and the second portion (111, 112) with each other such that the first and the second portion (111, 112) extend at an angle to each other, wherein
  the first and the second portion (111, 112)—based on the mounted and inflated condition of the gas bag (1)—extend at least approximately parallel to a plane defined by the vehicle height and vehicle length direction (z, x) and the connecting element (51, 51', 52) extends on a side of the gas bag (1) facing away from the vehicle occupant (2) to be protected and points towards the vehicle front, wherein
  the gas bag arrangement is arranged and formed for the protection of the upper body and/or the head of a passenger or a vehicle occupant (2) located on a rear seat of the vehicle.

14 Claims, 3 Drawing Sheets

(51) Int. Cl.
  *B60R 21/2334* (2011.01)
  *B60R 21/207* (2006.01)
  *B60R 21/232* (2011.01)
  *B60R 21/00* (2006.01)
  *B60R 21/233* (2006.01)
  *B60R 21/2338* (2011.01)

(52) U.S. Cl.
  CPC ......... *B60R21/232* (2013.01); *B60R 21/2334* (2013.01); *B60R 2021/0048* (2013.01); *B60R 2021/2074* (2013.01); *B60R 2021/23153* (2013.01); *B60R 2021/23308* (2013.01); *B60R 2021/23386* (2013.01)

(56) References Cited

U.S. PATENT DOCUMENTS

| | | | | |
|---|---|---|---|---|
| 6,932,380 B2 * | 8/2005 | Choi | ................... | B60R 21/232 280/730.1 |
| 7,448,644 B2 * | 11/2008 | Zhong | ................... | B60R 21/231 280/729 |
| 8,002,309 B2 * | 8/2011 | Kim | ................... | B60R 21/214 280/729 |
| 8,393,637 B2 * | 3/2013 | Choi | ................... | B60R 21/214 280/730.1 |
| 8,651,522 B2 * | 2/2014 | Hirth | ................... | B60R 21/233 280/729 |
| 8,789,849 B2 * | 7/2014 | Puzzonia | .............. | B60R 21/233 280/729 |
| 8,876,156 B2 * | 11/2014 | Turnbull | ............... | B60R 21/233 280/729 |
| 2005/0023806 A1 * | 2/2005 | Higuchi | ................. | B60R 21/231 280/730.1 |
| 2005/0206138 A1 * | 9/2005 | Breuninger | ........... | B60R 21/231 280/729 |
| 2010/0117343 A1 | 5/2010 | Hoffman et al. | | |
| 2012/0133114 A1 * | 5/2012 | Choi | ................... | B60R 21/214 280/728.2 |
| 2015/0217714 A1 * | 8/2015 | Fujiwara | ........... | B60R 21/23138 280/729 |

* cited by examiner

VEHICLE WITH A GAS BAG ARRANGEMENT OF A VEHICLE OCCUPANT RESTRAINT SYSTEM

CROSS-REFERENCE TO RELATED APPLICATIONS

The present application is a national stage application of International Application No. PCT/EP2013/065903 filed on Jul. 29, 2013 and claims priority from German Application No. 10 2012 213 284.8 filed on Jul. 27, 2012. The foregoing applications are incorporated by reference herein in their entireties.

This invention relates to a vehicle with a gas bag arrangement of a vehicle occupant restraint system according to the generic part of claim 1.

From the prior art, gas bags are known which will protect a vehicle occupant in particular during a frontal impact. For example, GB 953 312 A discloses a gas bag module with a gas bag which in the deployed condition fills the complete space between the vehicle occupant and the backrest of a vehicle seat arranged before the same. Therefore, the gas bag has a large volume which only can be filled via a gas generator with appropriate size. For accommodating gas generator and gas bag in the vehicle, a correspondingly dimensioned stowage space is necessary, which complicates the accommodation of such gas bag module in the vehicle.

It is the problem underlying the present invention to provide a vehicle with a gas bag arrangement which comprises a gas bag which offers the best possible protection during a frontal impact and nevertheless requires the smallest possible stowage space for the accommodation in the vehicle.

This problem is solved by providing a vehicle with a gas bag arrangement with the features according to claim 1. Developments of the invention are indicated in the dependent claims.

Accordingly, there is created a vehicle with a gas bag arrangement of a vehicle occupant restraint system, the gas bag arrangement comprising:
- a gas bag which includes at least one inflatable chamber with a first and a second portion; and
- at least one connecting element which connects the first and the second portion with each other such that the first and the second portion extend at an angle (obliquely or vertically) to each other, wherein
- the first and the second portion—based on the mounted and inflated condition of the gas bag—extend at least approximately parallel to a plane defined by the vehicle height and vehicle length direction, and the connecting element extends on a side of the gas bag facing away from the vehicle occupant to be protected and points towards the vehicle front, wherein
- the gas bag arrangement is arranged and formed for the protection of the upper body and/or the head of a passenger or a vehicle occupant located on a rear seat of the vehicle.

By the two portions of the gas bag extending at an angle to each other a good restraining effect is achieved also during a frontal accident, although the gas bag has a small volume as compared to conventional gas bags which will offer protection during a frontal accident. The gas bag arrangement serves the protection of a passenger or a vehicle occupant located on a rear seat of the vehicle, wherein the inflatable chamber of the gas bag supports e.g. on a part of a vehicle inner structure (such as the instrument panel or the backrest of a front vehicle seat), but in the inflated condition nevertheless does not fill the entire volume between the vehicle inner structure and the vehicle occupant to be protected.

For example, in the inflated gas bag the first and the second portion of the inflatable chamber extend towards each other against the vehicle forward driving direction, in particular such that the distance between the ends of the first and the second portion facing the vehicle inner structure, on which the inflated gas bag supports, is greater than the distance between the first and the second portion on the side of the gas bag facing the vehicle occupant.

The connecting element, which is formed e.g. in the form of a strap extending along the vehicle height direction or another non-inflatable element, prevents the inflatable chamber from stretching during filling and in particular holds the same in a bent or kinked condition, wherein the connecting element is pulled apart and stretched by the ends of the first and the second portion. The inflated gas bag thereby obtains a curved or kinked connecting portion, via which the first and the second portion of the inflatable chamber are connected with each other. The curved or kinked connecting portion faces the vehicle occupant to be protected in particular in the inflated condition of the gas bag, i.e. the connecting portion forms a curved or kinked partial region of the outside of the gas bag, which faces the vehicle occupant, so that during a frontal impact the vehicle occupant in particular will first impinge on the connecting portion. For example, the inflatable chamber thereby obtains a U-shaped or V-shaped design—as seen along the transverse vehicle direction.

The connecting portion in addition can include an additional inflatable region (e.g. in the form of a bulge) pointing away from the vehicle occupant, which forms the connecting element and which also serves e.g. for stabilizing the gas bag. The additional inflatable region in particular has an (e.g. curved) outside pointing away from the vehicle occupant. It is also conceivable that the additional inflatable region is provided as the only connecting element, in order to produce the angled course of the first and the second portion of the chamber.

The connecting element in particular extends along the vehicle height direction. It is also conceivable that the gas bag comprises several connecting elements which each connect the first and the second portion of the inflatable chamber with each other. For example, the connecting elements are arranged one behind the other as seen along the vehicle length direction.

It is also conceivable that the gas bag of the vehicle according to the invention comprises a plurality of inflatable chambers, extending e.g. at least approximately parallel to each other, which each include a first and a second portion, which via one connecting element or several connecting elements are connected with each other such that they extend at an angle to each other. For example, at least one connecting element is associated to each of the inflatable chambers. It is, however, also possible that a connecting element extends across several inflatable chambers or between the same, so that it connects the first and second portions of several chambers with each other.

The gas bag for example is formed of two (e.g. rectangular) gas bag layers, wherein the several inflatable chambers are delimited from each other e.g. by corresponding seams (darts) which connect the two gas bag layers with each other. At least some of the seams and thus at least some of the inflatable chambers can extend parallel to each other. It is, however, also possible that at least some of the seams are oriented obliquely to other seams.

In the inflated condition, the gas bag can extend behind a backrest of at least one front seat of the vehicle, i.e. the gas bag arrangement serves for the protection of a vehicle occupant located on a rear seat of the vehicle. In particular, at least one portion of the inflated gas bag is located between the backrest of a front seat and the upper body and/or the head of the vehicle occupant.

The gas bag arrangement can, however, be formed both for the protection of a passenger and for the protection of a vehicle occupant located on a rear seat. In both cases, the gas bag arrangement can be arranged in or on the roof of the vehicle. If the gas bag arrangement serves for the protection of a vehicle occupant sitting on a rear seat of the vehicle, it can also be accommodated in the backrest (in particular in a middle part of the backrest).

It is also conceivable that in the inflated condition of the gas bag an end of the first portion of the inflatable chamber is arranged in or on the roof of the vehicle; e.g. is fixed there or at a portion of a module housing of the gas bag arrangement located there, in which the non-inflated gas bag is arranged.

In addition, the gas bag can be arranged such that in the inflated condition it supports on a vehicle inner structure (e.g. the instrument panel or the backrest of a front vehicle seat). For example, the inflated gas bag rests against the vehicle inner structure via the connecting element. In particular, in the inflated condition the gas bag can support on a structure located in or on the roof of the vehicle with the end of the first portion of the inflatable chamber, and with an end of the second portion of the inflatable chamber on another vehicle inner structure (e.g. the above-mentioned instrument panel or the backrest of a front vehicle seat).

The invention will subsequently be explained in detail by means of exemplary embodiments with reference to the Figures, in which.

Figure 1:
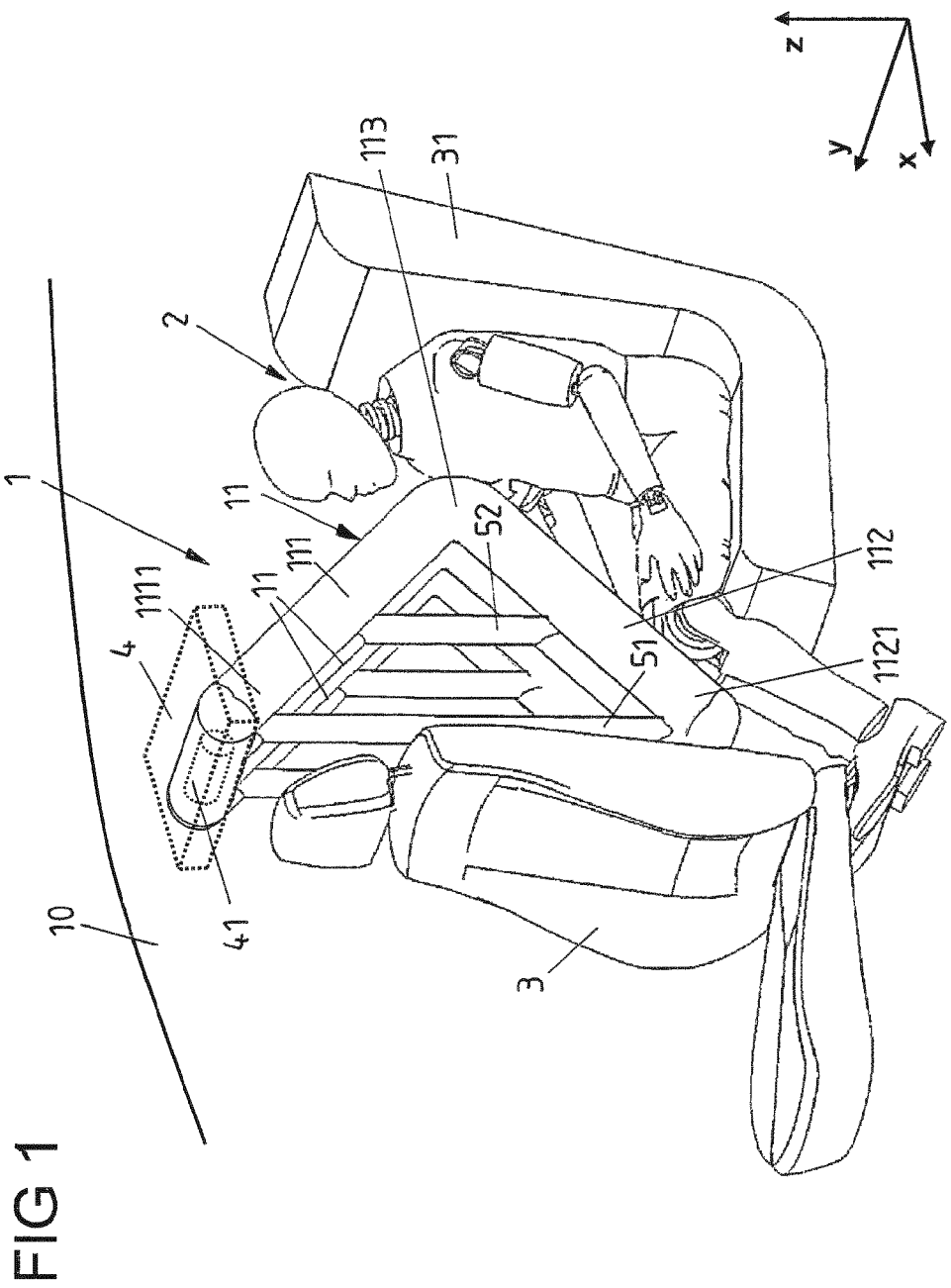
FIG. 1 shows a perspective view of a gas bag arrangement of a vehicle according to a first exemplary embodiment of the invention.

FIG. 1 shows a gas bag arrangement of a vehicle according to the invention with a gas bag 1 in the inflated condition, which serves for the protection of a vehicle occupant 2 located on a rear seat 31, which is why it extends between a backrest of a vehicle 3 and the vehicle occupant 2 to be protected. Before activation (inflation), the gas bag 1 is located in a module housing 4 in which a gas generator 41 for inflating the gas bag 1 also is accommodated.

The module housing 4 is arranged on or in a roof 10 of the vehicle and before inflation at least partly covered with the gas bag 1 towards the vehicle interior.

The gas bag 1 includes a plurality of inflatable chambers 11 which each comprise a first (upper) and a second (lower) inflatable portion 111, 112. The first and second portions 111, 112 of the two outer inflatable chambers 11 in transverse vehicle direction are connected with each other via two connecting elements (spacer elements) in the form of two tensioning straps 51, 52. The tensioning straps 51, 52 prevent the portions 111, 112 from moving away from each other beyond a predetermined extent, so that the inflatable chambers 11 are kinked (curved) approximately at the height of their center, and in the illustrated inflated condition of the gas bag the first and second portions 111, 112 extend at an angle to each other, i.e. the portions 111, 112 each include an (e.g. acute or obtuse) angle.

Correspondingly, the two portions 111, 112 are connected with each other approximately in the center (based on the vehicle height direction z) of the gas bag 1 via a curved connecting portion (curvature 113), wherein the curvatures 113 of the inflatable chambers 11 arranged one beside the other (in transverse vehicle direction y) together form a middle region of the gas bag 1 (based on the vehicle height direction z) and a curved outside of the gas bag 1 facing the vehicle occupant 2.

The first and the second portions 111, 112 also each extend at an angle with respect to the vehicle length direction x, namely such that in the region of their ends 1111, 1112 facing away from the vehicle occupant 2 they have the largest distance from each other and extend towards each other against the forward driving direction. Via the ends 1111 of the upper portions 111 the gas bag 1 is fixed in the module housing 4 and is filled via the ends 1111. It is also conceivable that the gas generator 41 at least partly is arranged in the (connected) ends 1111 of the upper portions 111, as indicated in FIG. 1.

In addition, the gas bag 1 is oriented such that the portions 111, 112 of the inflatable chambers 11, which extend substantially linearly and in a tube-like manner, each extend at least approximately in a or parallel to a plane defined by the vehicle height and vehicle length direction (z, x). The tensioning straps 51 extend on a side of the gas bag 1 facing away from the vehicle occupant 2 between a backrest of the seat 3 and the gas bag 1 along the vehicle height direction z, so that the curvatures 113 are facing the vehicle occupant 2, and during a frontal collision the vehicle occupant 2 will impinge on the gas bag 1 first in the region of the curvatures 113. In addition, the tensioning straps 51, 52 each are aligned such that they extend parallel to a plane oriented through the vehicle height direction and transverse vehicle direction z, y.

The tensioning straps 51, 52 each associated to one inflatable chamber 11 or to two adjacent chambers 11 are arranged one behind the other—as seen along the vehicle length direction x, wherein the outer tensioning straps 51, i.e. those tensioning straps which are located closer to the front seat 3, each are connected with the ends 1111, 1121 of the first and the second portion 111, 112 of the respective inflatable chambers 11. The further tensioning straps 52 are arranged further inside, i.e. at a distance from the ends 1111, 1121 of the portions 111, 112, and are shorter than the outer tensioning straps 51, so that the triangular shape of the gas bag 1 visible in FIG. 1 (in a side view along the transverse vehicle axis y) is obtained (shown in FIG. 1 in idealized form).

The gas bag arrangement with the gas bag 1 is positioned in the vehicle such that the inflated gas bag 1 can support on the backrest of the vehicle seat 3, wherein during an impact of the vehicle occupant 2 on the gas bag 1 the backrest can form an abutment which as far as possible holds the gas bag in its intended protective position. In particular, the gas bag 1 can rest against the backrest via the lower portions 112 (or via their ends 1121) and via the outer tensioning straps 51. The distance in vehicle length direction x between the curvatures 113 and the outer tensioning straps 51 (approximately identical with a height of the triangle) thus approximately corresponds to the distance to be bridged by the gas bag 1 between the vehicle occupant 2 and the component of the vehicle interior serving as support during a frontal impact (in the present case the backrest of the front vehicle seat 3).

In dependence on the extension of the filled gas bag along the vehicle length direction x, i.e. in dependence on the distance of the curvatures 113 to the ends 1111, 1121 of the first and second portions 111, 121 and to the outer tensioning straps 51, a contact of the vehicle occupant 2 with the gas bag 1 is effected directly after commencement of the forward displacement of the vehicle occupant 2 in forward driving direction or already before commencement of the forward displacement.

In the last-mentioned case, the extension of the gas bag in vehicle length direction is greater than the distance to be bridged between the vehicle occupant to be protected and the backrest of the front seat 3, so that already before a forward movement of the vehicle occupant a contact also can exist between the backrest of the seat 3 and the ends 1121 of the lower portions 112 of the inflatable chambers 11 as well as the outer tensioning straps 51. By making this contact, the gas bag builds up its restraining effect.

Removing the first and the second portions 111, 112 from each other is inhibited by the tensioning straps 51, 52, which with increasing penetration of the vehicle occupant 2 into the gas bag 1 are tensioned more strongly. In the further course of the penetration of the vehicle occupant 2 into the gas bag 1, the curvatures 113, the adjoining portions of the gas bag 1 as well as the inner tensioning straps 52 are shifted by the vehicle occupant 2 further in direction of the backrest of the vehicle seat 3. From a certain penetration depth, a contact is made between the inner tensioning straps 52 and the outer tensioning straps 51, wherein as mentioned above the outer tensioning straps 51 likewise can support on the backrest of the front seat 3.

The gas bag 1 shown in FIG. 1 includes four chambers 11 extending parallel to each other, which each are delimited from each other by seams. It is of course also conceivable that the gas bag 1 comprises more or less than four inflatable chambers. It also lies within the scope of the invention to use more or less tensioning straps; e.g. only one tensioning strap each can be associated to the inflatable chambers in vehicle length direction x, e.g. an outer tensioning strap 51 which connects the ends 1111, 1121 of the first and second portions of the inflatable chambers 11 with each other.

The inner tensioning straps 52 thus only are optional, in order to further stabilize the gas bag 1 and thus ensure the best possible restraint of the vehicle occupant 2 during a frontal impact. This can be necessary in particular when, as seen in vehicle length direction x, the distance between the curvatures 113, i.e. the side of the gas bag 1 facing the vehicle occupant to be protected, and the outer tensioning straps 51 is large.

It is also possible that the gas bag shown in FIG. 1 is installed for the protection of a passenger, wherein the gas bag arrangement e.g. instead of a conventional passenger gas bag module is accommodated in the instrument panel or likewise in the roof of the vehicle.

In particular, several gas bags like the gas bag shown in FIG. 1 can of course also be provided in the vehicle, e.g. for the protection of a passenger and a person located on the rear seat.

Figure 2:
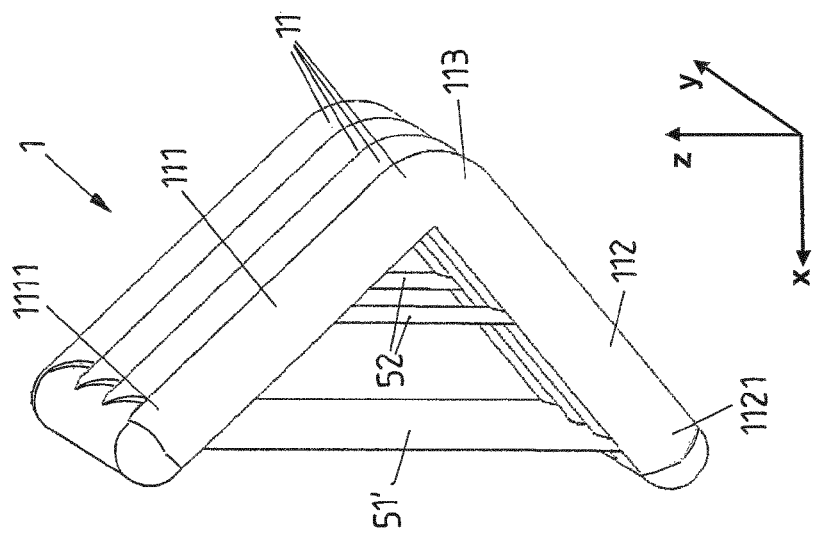
FIG. 2 shows the gas bag of the gas bag arrangement from FIG. 1 in another view.

FIG. 2 shows the gas bag of FIG. 1 in another perspective view, likewise in its deployed condition. The representation of details, such as e.g. a blow-in region for the gas generator or of seam contours, has been omitted for reasons of clarity. As already mentioned above, the gas bag 1 consists of several tubular chambers 11 aligned parallel to each other, which are arranged one beside the other in transverse vehicle direction y. The chambers 11 are in flow connection with each other e.g. via the ends 1111, 1121 of their upper and/or lower portions 111, 112.

The gas bag 1 for example can be fabricated of two gas bag layers (fabric portions) which are connected with each other in the edge region via a circumferential seam. The chambers 11 in particular are delimited by means of a plurality of continuous seams which likewise connect the two gas bag layers with each other and divide the gas bag into the inflatable chambers 11.

The stretched length of the gas bag 1, i.e. its extension along the main direction of extension of the chambers 11 in the condition spread out flat before arranging the tensioning straps 51, 52, is greater than the length of the tensioning straps 51, 52 which later on are fixed at the portions 111, 112 of the chambers 11. After fixing the tensioning straps 51, 52 at the gas bag, the curved shape of the gas bag 1 in the deployed (filled) condition thus is obtained.

It is also conceivable that the gas bag 1 is manufactured of more than two gas bag layers, whereby it can be achieved for example that the gas bag has a curved shape already before mounting the tensioning straps 51, 52. This manufacturing method in particular is possible with a design of the gas bag corresponding to FIG. 5 which will yet be explained below.

It is expressly noted that the described (mattress-like) design of the gas bag (with several chambers extending parallel to each other) and the above-described manufacturing methods merely are to be understood by way of example. Worded more generally, the chambers 11 of the gas bag 1 in the deployed condition vertically to a plane formed by the adjacent first or second portions 111, 112 of the chambers 11 have a thickness D which as compared to the extension of the gas bag 1 along this plane is small (e.g. maximally is 250 mm), so that the combination of the adjacent chambers 11 extends in a relatively flat form. The space filled by the gas bag 1 between the vehicle occupant 2 to be protected and the supporting vehicle interior structure (in FIG. 1 the backrest of the vehicle seat 3) is smaller than its volume filled by the gas generator. The amount of materials used also is smaller than for a conventional gas bag supporting on the backrest of a front seat.

The described relatively flat design of the fillable volume of the gas bag 1 for example also can be realized by spacers or interrupted seams arranged between the gas bag layers delimiting the chamber 11, e.g. also without dividing the gas bag into chambers. Thus, it is conceivable that instead of the several chambers shown in FIGS. 1 and 2, the gas bag has only one inflatable chamber which includes the upper and the lower portion 111, 112. In transverse vehicle direction x, for example, the one chamber has a width which corresponds to the width of the gas bag of FIGS. 1 and 2.

Figure 3:
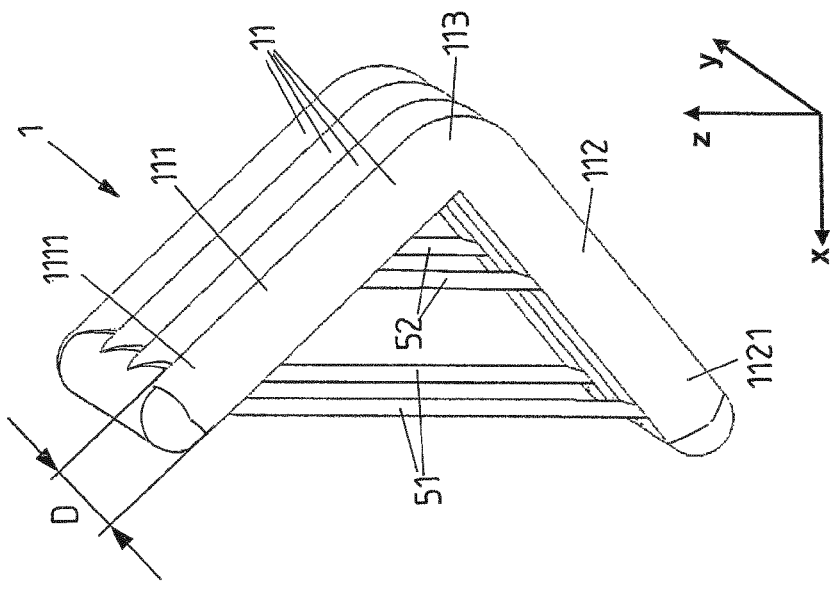
FIG. 3 shows a gas bag arrangement of a vehicle according to a second exemplary embodiment of the invention.

FIG. 3 shows a modification of the gas bag of FIGS. 1 and 2, according to which the two outer tensioning straps 51 have been replaced by a single broad tensioning strap 51'. This can counteract the risk of the tensioning strap slipping off along the backrest of the seat 3 and provide for a support of the gas bag also under high loads.

Figure 4:
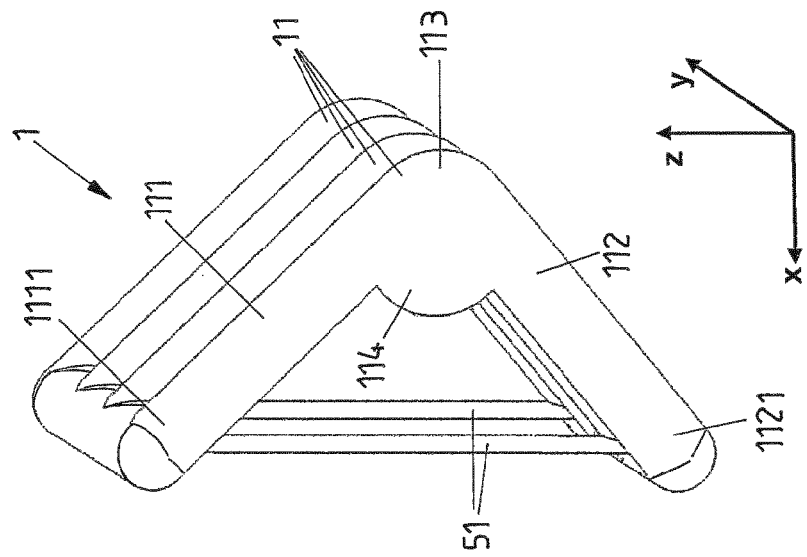
FIG. 4 shows a gas bag arrangement of a vehicle according to a third exemplary embodiment of the invention.

According to FIG. 4 the two outer tensioning straps 51 are connected with each other by a web 511 extending transversely to the same, wherein there can also be provided several webs. Analogous to the use of a broader outer tensioning strap according to FIG. 3, the webs serve to counteract the risk of the tensioning strap slipping off along the backrest of the seat 3.

It should be noted that the designs of the outer tensioning straps 51 as described in connection with FIGS. 3 and 4, which are facing the backrest of the front seat 3, also are applicable for the inner tensioning straps 52.

Figure 5:
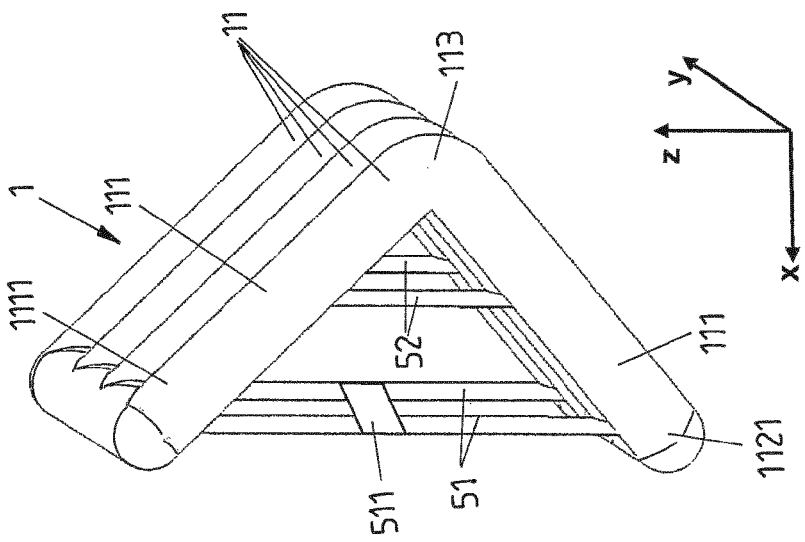
FIG. 5 shows a gas bag arrangement of a vehicle according to a fourth exemplary embodiment of the invention.

FIG. 5 shows a further embodiment of the gas bag of a vehicle according to the invention, wherein the gas bag 1 has no inner tensioning straps in contrast to the preceding exemplary embodiments. Their function is adopted by an additional inflatable region of the chambers 11, which extends in direction of a transverse vehicle axis (y-direction) and is formed by a bulge 114 of the curvatures 113. As seen in driving direction, the bulges 114 are located between the respective curvature 113 and the outer tensioning straps 51 and thus point away from the vehicle occupant 2, wherein they each have a curved outside facing away from the vehicle occupant 2. Instead of the bulges 114, there can also each be provided additional separate chambers which of course also can be in flow connection with each other. It is also conceivable that a single additional inflatable region is provided, which is connected with the chambers 11. It is also conceivable that a tensioning strap is omitted completely and the angled course of the first and the second portion 111, 112 only is produced by the additional inflatable region (for example in the form of the bulges 114).

It should be noted that elements of the exemplary embodiments described above can of course also be used in combination with each other. For example, the additional inflatable region 114 of FIG. 5 also might be realized in the gas bag of FIGS. 1 and 2.

LIST OF REFERENCE NUMERALS

1 gas bag
2 vehicle occupant
3 vehicle seat
4 module housing
10 roof
11 inflatable chamber
31 rear seat
41 gas generator
51, 51' outer tensioning strap
52 inner tensioning strap
111 first portion
112 second portion
113 curvature
114 bulge
511 web
1111 end of first portion
1121 end of second portion

The invention claimed is:

1. A vehicle with a gas bag arrangement of a vehicle occupant restraint system, the gas bag arrangement comprising:
   a gas bag which includes at least one inflatable chamber with a first and a second portion; and
   a plurality of connecting elements arranged one behind the other along the vehicle length direction, wherein each connecting element connects the first and the second portion of the inflatable chamber, and
   wherein each of the connecting elements is configured to hold the inflatable element in a bent or kinked condition such that the first and the second portion extend at an angle to each other;
   wherein the first and the second portion—based on the mounted and inflated condition of the gas bag—extend at least approximately parallel to a plane defined by the vehicle height and vehicle length directions and the connecting element extends on a side of the gas bag facing away from the vehicle occupant to be protected and points towards the vehicle front, and
   wherein the gas bag arrangement is arranged and formed for the protection of the upper body and/or the head of a passenger or a vehicle occupant located on a rear seat of the vehicle.

2. The vehicle according to claim 1, wherein the first and the second portion of the gas bag extend in the inflated gas bag and towards each other against the vehicle forward driving direction.

3. The vehicle according to claim 1, wherein the inflatable chamber of the gas bag is formed oblong.

4. The vehicle according to claim 1 wherein in the inflated and bent or kinked condition, the gas bag faces the vehicle occupant to be protected.

5. The vehicle according to claim 1 wherein at least one of the connecting elements includes an additional inflatable region pointing away from the vehicle occupant.

6. The vehicle according to claim 1, wherein the inflatable chamber of the gas bag—as seen in transverse vehicle direction—has a U-shaped or V-shaped design.

7. The vehicle according to claim 1, characterized by a plurality of inflatable chambers of the gas bag, which each include a first and a second portion which via several connecting elements are connected with each other such that they extend at an angle to each other.

8. The vehicle according to claim 1, wherein each of the connecting elements is formed in the form of a strap which in the mounted condition of the gas bag arrangement extends in vehicle height direction.

9. The vehicle according to claim 8, wherein to at least one of the chambers two connecting elements spaced from each other are associated, which are arranged one behind the other as seen in vehicle length direction.

10. The vehicle according to claim 1, wherein in the inflated condition the gas bag extends behind a backrest of at least one front seat of the vehicle.

11. The vehicle according to claim 1, wherein the gas bag of the gas bag arrangement is arranged such that in the inflated condition the gas bag supports on a vehicle inner structure.

12. The vehicle according to claim 1, wherein the gas bag is arranged in or on the roof of the vehicle or in the backrest of a vehicle seat.

13. The vehicle according to claim 1, wherein in the inflated condition of the gas bag an end of the first portion of the inflatable chamber is arranged in or on the roof of the vehicle.

14. The vehicle according to claim 13, wherein in the inflated condition the gas bag supports on a structure located in or on the roof of the vehicle with the end of the first portion of the inflatable chamber, and supports on another vehicle inner structure with an end of the second portion of the inflatable chamber.

* * * * *